March 1, 1960 C. B. NELSON ET AL 2,926,618
RAILWAY VEHICLE
Filed Dec. 29, 1954 6 Sheets-Sheet 1
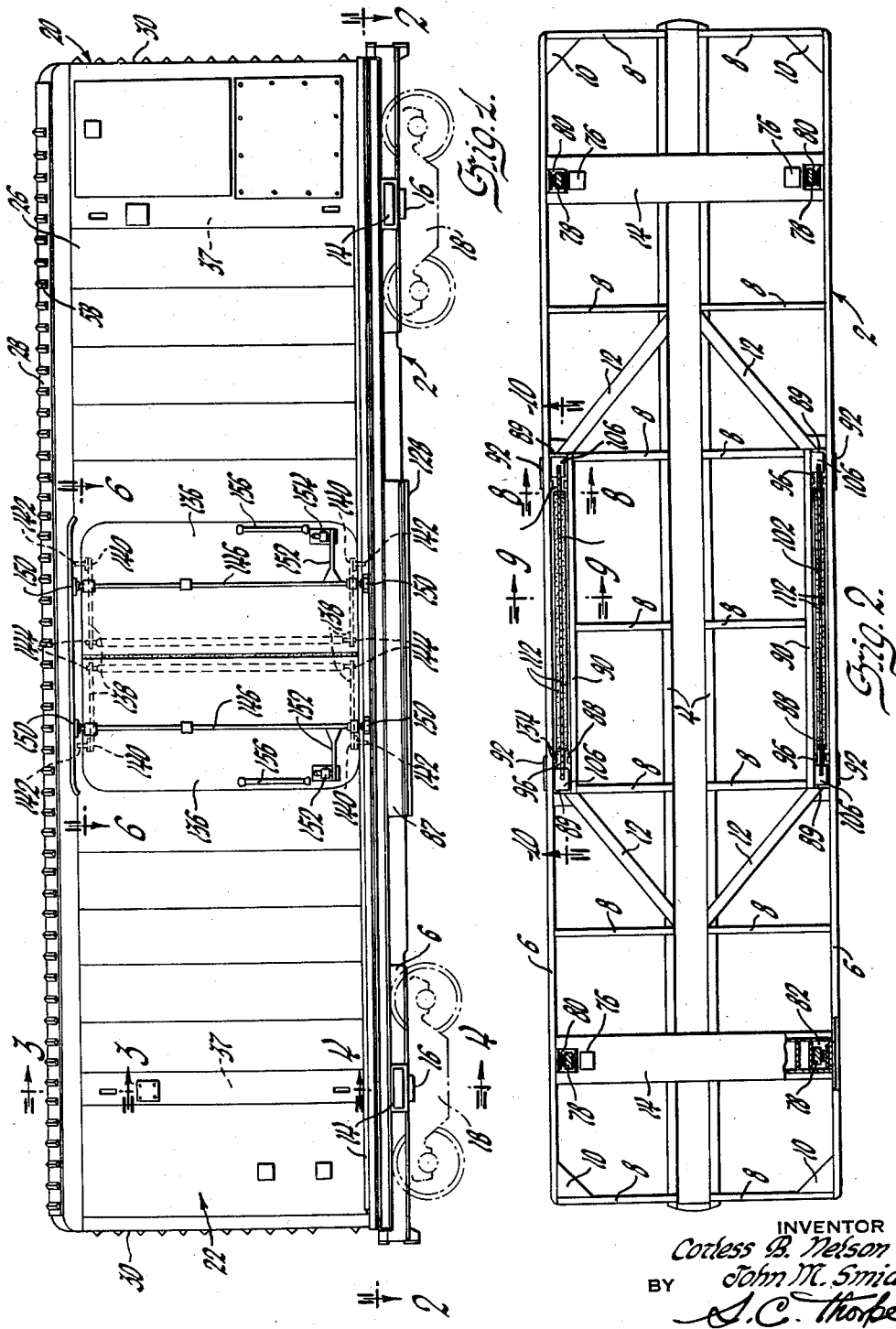
INVENTOR
Corless B. Nelson &
BY John M. Smidt
A. C. Thorpe
ATTORNEY

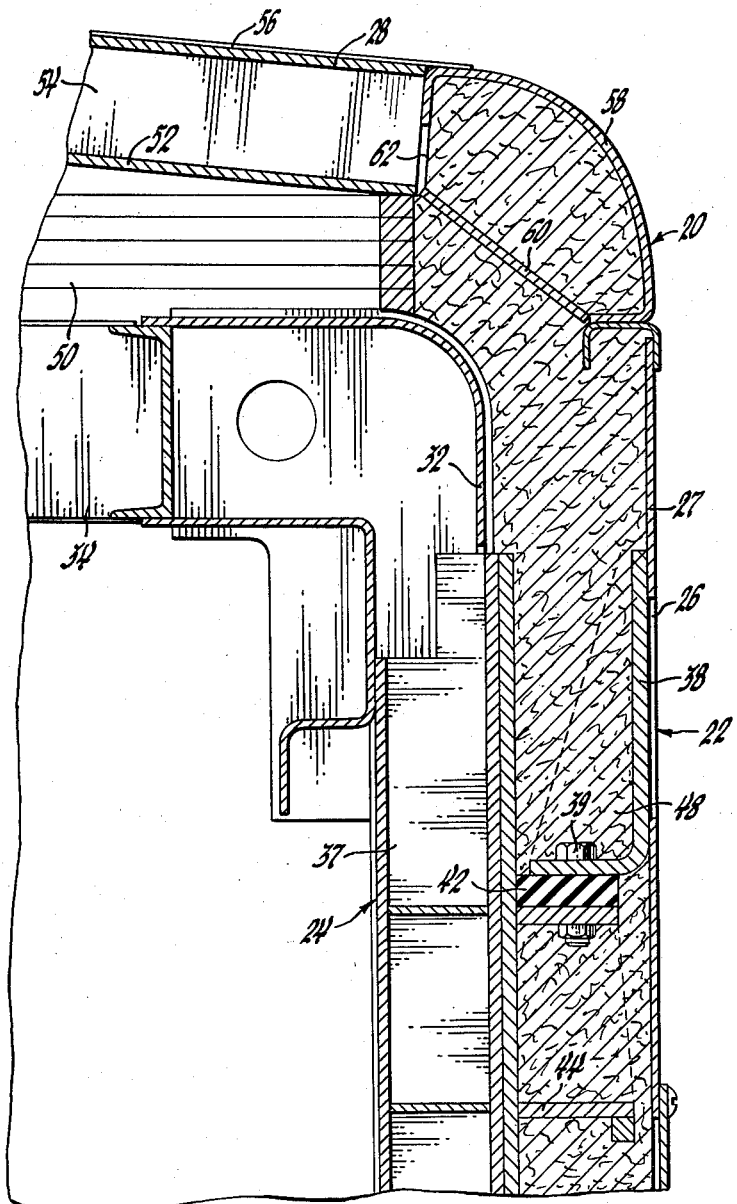

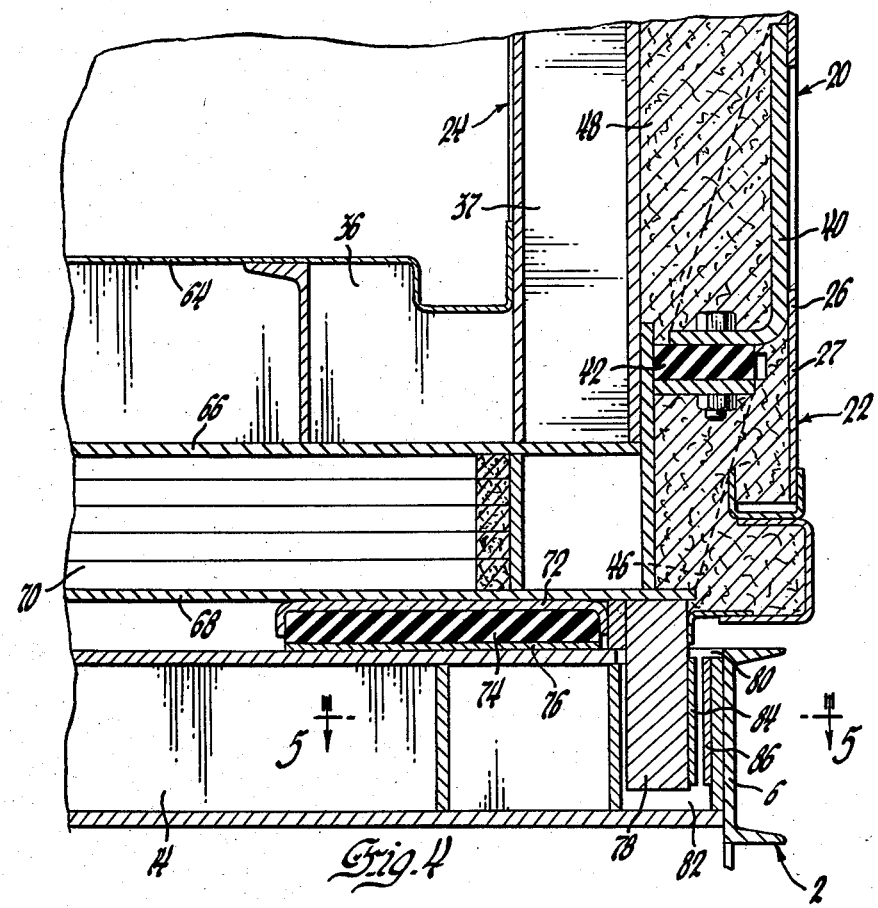
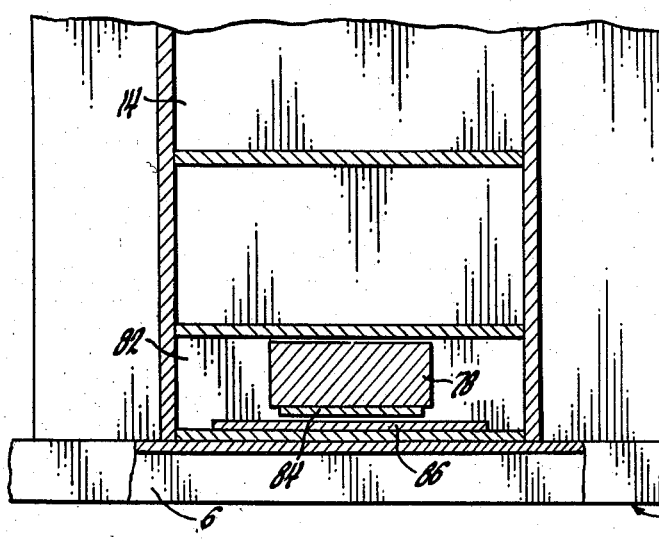

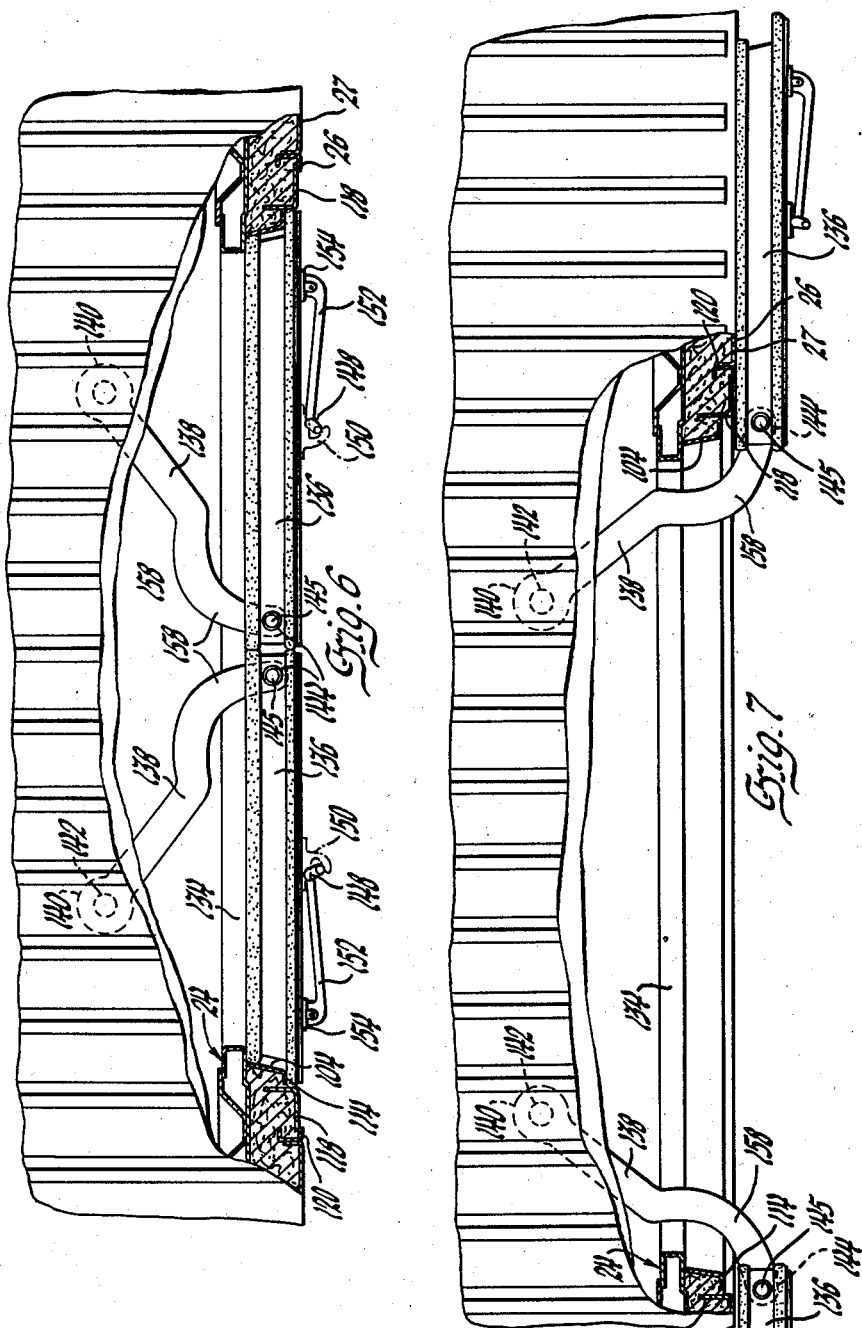

March 1, 1960   C. B. NELSON ET AL   2,926,618
RAILWAY VEHICLE
Filed Dec. 29, 1954   6 Sheets-Sheet 5
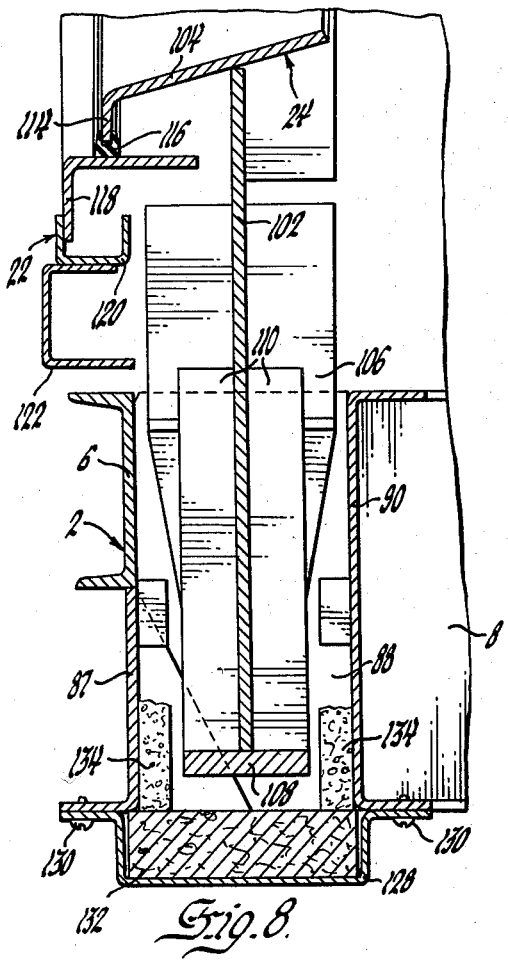
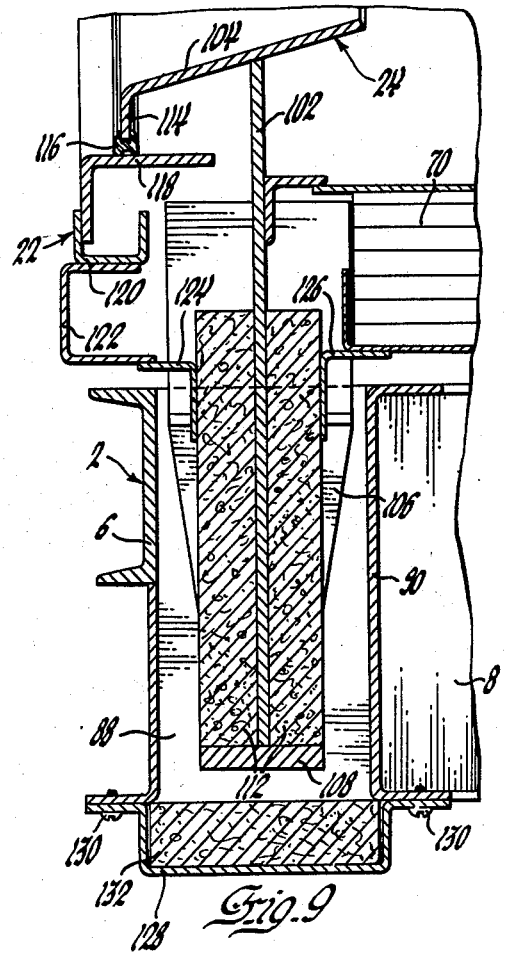
INVENTOR
Corless B. Nelson &
BY   John M. Smidl
J. C. Thorpe
ATTORNEY March 1, 1960 C. B. NELSON ET AL 2,926,618
RAILWAY VEHICLE
Filed Dec. 29, 1954 6 Sheets-Sheet 6
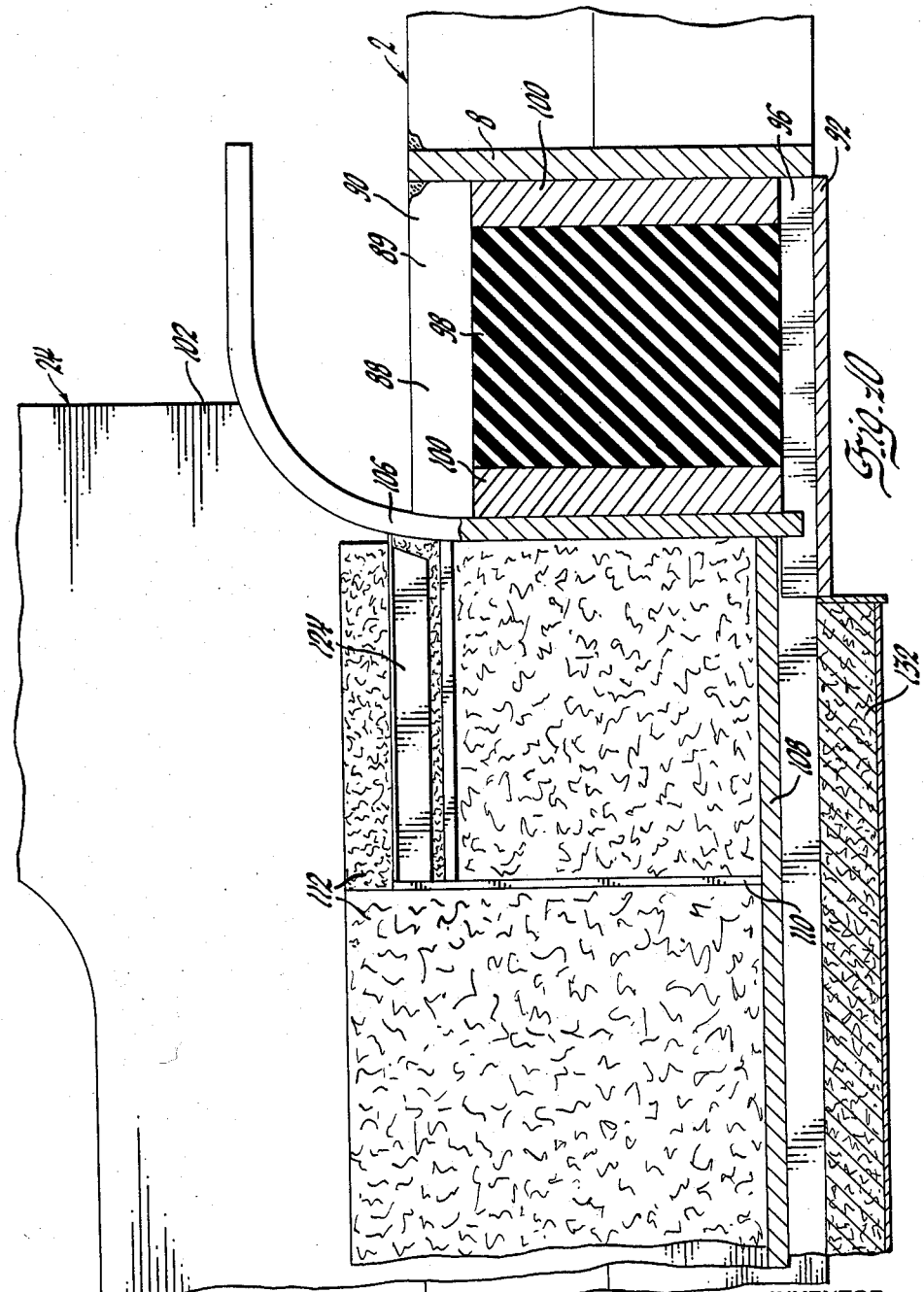
INVENTOR
Corless B. Nelson &
BY John M. Smidt
J.C. Thorpe
ATTORNEY

United States Patent Office 2,926,618
Patented Mar. 1, 1960

2,926,618

RAILWAY VEHICLE

Corless B. Nelson, Chicago, and John M. Smidl, Wheaton, Ill., assignors to General Motors Corporation, Detroit, Mich., a corporation of Delaware Application December 29, 1954, Serial No. 478,348

7 Claims. (Cl. 105—454)

This invention relates generally to railway vehicles and more particularly to vehicles adapted to carry lading which is to be loaded and unloaded through apertures in the side walls of the body of the vehicle. The invention is particularly concerned with the protection of the lading carried by the vehicle body by cushioning of the body against buff loads applied to the ends of the underframe. This is accomplished by allowing the body of the vehicle to move longitudinally relative to the underframe and then cushioning this relative movement in a novel manner. Although the invention is to be described in connection with a refrigerator car, it should be appreciated, as the description proceeds, that application of the invention is not limited to refrigerator cars but is much more general and is applicable on all kinds of railway and other types of vehicles.

Another feature of the invention to be emphasized is the provision of novel hinging arrangements for the railway vehicle doors on either side of the body of the vehicle which enable the doors to be pivoted open and also moved longitudinally of the car so that they lie flush against the side walls of the car when in the fully open position thereby taking up a minimum amount of clearance and enabling the car to be located closer to the ramp or platform which is used to transfer the goods to and from the interior of the car body.

A further feature of this invention also worthy of mention is the fabrication of the body which involves the use of inner and outer wall structures wherein the outer wall structure is supported on the inner structure and the inner structure movably resides on the underframe of the vehicle and the two structures are reinforceably secured together by means of a polyisocyanate foam poured between these two structures and bonded thereto, this foam acting not only to insulate the inner wall structure from the outer wall structure but additionally serving to increase the strength of the side walls of the car.

One of the problems encountered in railway vehicles which are utilized for the transportation of lading is that usually the body is rigidly connected to the underframe so that the neutral axis of the entire unit is located somewhere above the horizontal plane through the underframe in which the buff loads to which the car is often subjected are applied. (Buff loads occur during switching operations, braking, acceleration, etc.) When these buff loads are applied, there is a tendency on the part of the entire car to bend as an elastic beam along its neutral axis located somewhere above the underframe. This bending has a disastrous effect on the structure of the car and results in the loosening of fastenings, the breaking of joints, tearing of plates, binding of doors, etc. The present invention has been proposed to overcome this defect by separating the railway vehicle body from the underframe and supporting the body on the underframe at only two remotely spaced points, in the present instance preferably adjacent the ends of the body and the underframe. This separation of these two units of the railway vehicle results in each unit having a separate neutral axis. Consequently when buff loads are applied to the underframe, which as mentioned often happens to vehicles of this kind, these loads will act along the neutral axis of the underframe and will not cause any bending of the body supported thereon. Additionally, the body is not only supported only adjacent the ends thereof on the underframe adjacent the ends of the underframe but is also adapted to slide longitudinally with respect thereto. This allowance of relative longitudinal movement between the vehicle body and the underframe cushions the shock loads applied to the ends of the underframe through novel cushioning means provided between the body and the underframe which serve to absorb a substantial portion of these shock loads.

For a further understanding of this invention and the objects thereof reference may be had to the accompanying detailed description and drawings, in which:

Fig. 1 is a side view in elevation of a railway vehicle incorporating the invention.

Fig. 2 is a view in plan and in section taken on the line 2—2 of Fig. 1 and particularly shows the underframe of the vehicle, transversely spaced wells intermediate the ends of the underframe on either side of the longitudinal centerline thereof into which extend longitudinal shear plates rigidly attached to the vehicle body.

Fig. 3 is a fragmentary view in section taken on the line 3—3 of Fig. 1 and illustrates the inner and outer wall structures of the vehicle body, how the outer wall structure is spaced from and supported by the inner wall structure and how these two wall structures are reinforced by the use of bonding polyisocyanate foam therebetween.

Fig. 4 is a fragmentary view in section taken on the line 4—4 of Fig. 1 at the same longitudinal location as Fig. 3 but at a lower level of the car. Fig. 4 also illustrates how the outer wall structure of the body is supported on the inner wall structure and how the inner wall structure is slidably supported on the underframe and prevented from moving transversely with respect thereto.

Fig. 5 is a fragmentary plan view in section taken on the line 5—5 of Fig. 4 and serves to illustrate how depending chafing plates or pads secured to the bottom side of the inner wall structure extend into pockets in the underframe to prevent transverse movement of the body structure relative to the underframe, these pads being located at spaced points longitudinally and transversely of the vehicle.

Fig. 6 is a view in plan taken on the line 6—6 of Fig. 1 with parts broken away to illustrate the door structure of the vehicle and the unique hinging arrangement for the doors which enable the doors to be pivoted out of the planes of the side walls of the vehicle and moved longitudinally along the vehicle to locations where they lie adjacent the side walls of the vehicles in planes parallel thereto completely out of the way of the door openings.

Fig. 7 is a view similar to Fig. 6 showing the doors in their open position and how the openings in the side walls of the vehicle are completely free of the doors and the doors are located flush against the side walls of the vehicle so that the car may be moved in extremely close proximity to the platform or ramp used to transfer the goods into and out of the car.

Fig. 8 is a view in elevation taken on the line 8—8 of Fig. 2 and illustrates how the shear plates rigidly connected to the inner wall structure of the refrigerator car extend into the wells provided in the underframe so as to absorb shocks and cushion movement of the underframe relative to the vehicle body.

Fig. 9 is a view similar to Fig. 8 except that it is taken at a slightly different location to indicate that the shear plate is provided with an insulating material tending to reinforce the plate and also better locate it between structure connected to both the inner and outer wall structures. Fig. 9 also illustrates how the wells are closed below so as to completely enclose the shear plates.

Fig. 10 is a view in elevation taken on the line 10—10 of Fig. 2 and again illustrates how the shear plates including transversely or laterally extending plating on the ends thereof extend down into the wells provided in the underframe on either side thereof and further how the wells are provided with pockets at either end in which are inserted resilient blocks.

Referring now to the drawings and particularly to Figs. 1 and 2 the railway vehicle includes an underframe indicated generally by a numeral 2. The underframe 2 comprises a pair of channels or longitudinally extending central strength members 4 positioned on either side of the longitudinal centerline of the vehicle and adjacent thereto and a pair of outboard longitudinally extending channels forming outboard side sills 6, the sills and members 4 being secured together by suitable transverse ribs or strength members 8, gusset plates 10, diagonal struts 12 and a pair of longitudinally spaced transversely extending underframe bolsters or bolster members 14. The underframe bolsters 14 have on the under side thereof depending center bearings 16 (see Fig. 1) which are received by the usual railway vehicle wheeled trucks 18.

The body of the vehicle, which is indicated generally by a numeral 20, is made up of two main structures, an outer body structure indicated by the numeral 22 and an inner body structure spaced inwardly from the outer body structure and indicated by the numeral 24 (see particularly Figs. 3 and 4). The outer body structure comprises outer side walls 26 including thin plates 27, a roof structure 28 and end walls 30 (see Fig. 1). The inner body structure 24 comprises built-up side walls 32, a built-up ceiling or top wall 34, a compartmented bottom wall 36 and built-up end walls which, although not shown, are spaced from the end walls of the outer body structure. The inner side walls 32 of the inner body structure 24 each have built thereinto at spaced intervals two upstanding stanchions or body bolsters 37 located directly over the bolster members 14 of underframe 2 in order to support the inner body structure on the underframe at only four points (opposite ends of the bolster members 14) in a manner to be described in detail shortly.

As suitably indicated in the Figs. 3 and 4, the outer side walls 26 of the outer wall structure 22 have upper and lower brackets 38 and 40, respectively, welded or otherwise suitably secured thereto directly opposite each stanchion 37. These brackets 38 and 40 are supported on suitable insulating pads 42 in turn supported on upper and lower brackets 44 and 46, respectively, welded or otherwise secured to the stanchions 37 built into side walls of the inner wall structure and spaced along their lengths. The brackets 38 and 44 are secured together by bolt assemblies 39 and suitable insulating washers. Filling up the space provided between the side walls of the inner and outer wall structures is insulation 48 preferably in the form of a foamed plastic involving the reaction product of an organic polyisocyanate and a polyester such as meta-toluene diisocyanate and an alkyd resin. This insulation which is poured into the space between the walls 26 and 32 not only insulates the walls of the car but also adds a considerable amount of strength to these side walls and aids in supporting the outer body structure 22 on the inner body structure 24. The polyisocyanate insulation forms an extremely strong bond with the metallic plates with which it comes in contact and is structurally quite strong in comparison with the usual fiberglass-type insulation. It does not pack or shake down, deteriorate or decompose, nor is it affected by moisture. The space between the roof or outer top wall 28 of the car and the ceiling or top wall 34 of the inner wall structure is provided with a different type insulation 50 which is made up of thin sheets of aluminum separated by corrugated cardboard spacers. This insulation, which appears to terminate adjacent the lower foot or flange 52 of transversely extending I-beams 54 forming the strength members of the roof 28, actually extends upwardly to the upper plating 56 of the roof on either of the sides of these I-beams 54. The rounded edge constructions connecting the upper edges of the outer side walls 26 and the top wall 28 comprise rounded plating 58, intermittent reinforcing strips or webbing 60 and webs 62 which form pockets along the length of the car. These pockets are also filled with the polyisocyanate foam in order to increase the strength thereof, deaden sound and provide additional insulation. The bottom wall or floor of the inner body structure 24 is made up of a plurality of horizontally extending plates 64, 66, 68. The plates 66 and 68 have therebetween insulating material 70 similar to the insulating material provided between the ceiling of the inner body structure and the roof of the car.

As previously mentioned, the body of the railway vehicle is supported on the underframe 2 for longitudinal sliding movement with respect thereto at only four rectangularly spaced points located at opposite ends of the two bolsters 14 provided in the underframe. Referring now to Figs. 2, 4 and 5 it will be observed that directly below each of the stanchions or body bolsters 37 on the underside of plate 68 is a downwardly facing plate-like receptacle 72 which has anchored therein a chafing pad 74 preferably made of some non-metallic phenolic material which has a higher rate of wear than that of steel. Pad 74 slidably rests on an upwardly facing plate 76 secured to the upper face of bolster 14 in underframe 2 adjustment an end of bolster 14. The phenolic pads 74 slidably resting on the plates 76 allow the body structure of the vehicle to move longitudinally with respect to the underframe. In order to prevent lateral movement of the body structure of the vehicle relative to the underframe it will be observed that also secured to the inner body structure and depending therefrom below each of the stanchions or bolsters 37 is a small vertical lug 78. The lugs 78 extend downwardly through apertures 80 in the upper face of the underframe bolsters 14 into recesses or pockets 82 provided therein. The lugs 78 are provided with lateral outward-facing chafing plates 84 which are adapted to abut cooperating lateral inwardly facing plates 86 on the outer walls of the pockets 82 so as to prevent lateral movement of the body structure of the vehicle relative to the underframe. There is, however, a sufficient amount of clearance between the end walls of the pockets 82 and the lugs 78 to allow a limited amount of longitudinal movement thereof relative to the bolsters 14 and underframe 2. It should be appreciated that with this type of four-point suspension even though unusually large buff loads are applied to the ends of the underframe so as to in fact cause it to hump or sag this humping or sagging will not be transferred to the body structure, which would otherwise cause stresses on the body structure, plates, the doors, etc.

While allowing the body structure and the goods carried thereby to move longitudinally relative to the underframe tends to prevent damage of the goods by buff loads applied to the underframe, of necessity this longitudinal relative movement must be limited. This is accomplished by the unique cushioning and limiting means next to be described.

Referring now to Figs. 2, 8, 9 and 10 it will be observed that the underframe 2 is provided adjacent the sides thereof intermediate the ends of the underframe with a pair of oppositely disposed wells 88 which are formed by the sills 6 deepened by the angular members 87, inwardly spaced channels 90 and deepened pairs of transversely extending strength members 8. The wells 88 are provided at either end thereof with pockets formed by flat plates 92 secured to the underside of the underframe adjacent the ends of the wells and also by small vertical insulating pieces 134 defining slots 96 leading from the main part of the wells 88 into the pockets 89. The small plates 92 forming the bottom sides of pockets 89 are each provided with small skids 96 on which are supported resilient block assemblies comprising a central resilient portion 98 preferably of rubber and metallic end plates 100. Secured to the sides of the inner body structure intermediate the ends thereof and depending therefrom are two oppositely disposed shear plates 102 which extend into the wells 88. The shear plates 102 are welded or otherwise secured at their upper edges to door jambs or frames 104 defining the door openings and forming part of the inner body structure 24. The longitudinally facing ends of shear plates 102 are provided with end facing plates 106 which are bent in an arc adjacent their upper ends so that the upper ends thereof are substantially horizontal. The lower edges of shear plates 102 are provided with horizontally extending reinforcing plates 108 which are suitably secured to the lower edges of shear plates 102 and also to the end plates 106. The shear plates 102, then, including end plates 106 extend between opposite resilient block assemblies and any longitudinal movement of the body structure of the vehicle is cushioned through these shear plates and the cushioning block 98. In other words, if buff loads should be applied to the underframe 2 which would cause the body structure to move on the pads 72, 76 such movement would be increasingly resisted by the resilient blocks 98 thereby protecting the goods carried by the body of the railway vehicle. In order to vertically stiffen the shear plates 102 they have been provided with additional reinforcing plates or ribs 110 located adjacent the ends of the shear plates. These ribs 110 and horizontal plate 108 also provide support for suitable insulating material 112 so as to insulate the shear plates 102 from the underframe 2. Referring again for a moment to the door frames 104 it will be observed they terminate outwardly in a flange 114 which is provided with a rubber insulating seal 116 around the peripheral edge thereof. The outer wall structure around the doors includes the angular door frame 118, the member 120 channel-shaped in cross section, member 122 also channel-shaped in cross section and the small angular member 124, all suitably secured together preferably by welding. The angular member 124 serves two functions. It aids in maintaining the insulating material 112 in place and also tends to prevent any lateral bending or play of the shear plate 102. A similar structure is provided on the inward side of plate 102 which includes the angular member 126. Member 126 as in the case of member 124 aids in maintaining the insulating material 6 in place and also tends to prevent lateral play of the shear plates 102. It will be observed that the bottom sides of the wells 88 are closed by a recessed cover plate 128 which is suitably secured as by screws 130 to the lower flanges of the deepening members 87 and channels 90. Located in the recessed portion of cover plates 128 is more insulating material 132. Insulating material 132 along with the other insulating material previously mentioned and insulating material 134 further aids in protecting the shear plates 102 and insulating them from the underframe 2.

Turning now to Figs. 1, 6 and 7 it may be seen that the door and hinging structure of the railway vehicle is unique. In Figs. 1, 6 and 7 it will be observed that the side wall shown of the railway vehicle body is provided with an aperture 134 intermediate the ends thereof which may be closed by a pair of vertically hung, horizontally swinging doors 136. Although not shown, the opposite side wall of the vehicle is provided with a similar aperture and similar vertically hung, horizontally swinging doors. The hinging structure of these doors is considered novel and comprises upper and lower hinges 138 which are pivoted at one end 140 about pivot points 142 located inboard of the side walls of the vehicle. The opposite ends 144 of the hinges 138 are pivotally connected to adjacent corners of the doors through rigid connections to vertical bars 145 pivotally mounted in the planes of the doors such that the doors may pivot on the ends of the hinges 144 about vertical axes of bars 145 which lie in the planes of the doors. In the fully closed position, as shown in Fig. 6, the two doors and the side wall lie in a common plane. Each door 136 is provided with a hinged vertical bar 146 which carries eccentric cranks 148 engageable in lugs 150 provided at the top and bottom of the doors on the railway vehicle body side walls. The bars 146 have secured thereto for turning the bar handles 152 which are adapted to be locked in place flush against the door by locking means 154. In order to open the doors when closed, as shown in Fig. 6, the locking means 154 are first removed in order to release the handles 152. Movement of handles 152 causes bar 146 and eccentric cranks 148 to rotate camming the doors out of the plane of the side wall. Handles 156 provided on the extreme outer edges of the doors may then be grasped and pulled outwardly and longitudinally so that the doors take up the positions shown in Fig. 7. It will be noted that the hinges 138 are provided with curved portions 158 which eliminate interference between the hinges and the door frames 104 so as to enable the doors to be moved completely out of the aperture 134. The doors themselves are provided with insulating seals extending around the peripheral edges of the inner and outer faces of the doors which engage the door jambs adjacent the inner and outer wall structures so as to continue the separation of the inner and outer wall structures and maintain the insulating characteristics of these two structures. With this type of door arrangement and hinge construction it will be observed that only one door may be opened if desired or both doors may be opened if desired. One door may be made to operate as a typical vertically hung door or else it can be uniquely moved out of the aperture and adjacent the side of the vehicle and in a plane parallel to the plane of the side wall of the vehicle so as to take up a minimum amount of space and enable the vehicle to be located as close as possible to a loading dock, etc., in order to simplify the loading and unloading of the vehicle. The door openings are made wide enough to enable lift and loading trucks to be driven through them. The use of this type of hinge eliminates costly tracks and roller assemblies, etc., which are constantly in need of adjustment, repair, etc.

What we claim is:

1. A railway vehicle comprising an underframe having supporting railway vehicle trucks disposed therebelow, said underframe having a well intermediate the ends thereof extending longitudinally therealong, a body slidably supported on said underframe, a longitudinally extending plate-like member rigidly secured to and depending from said body and extending into said well, and resilient means interposed between the ends of said plate-like member and the ends of said well whereby longitudinal movement of said body relative to said frame is cushioned.

2. A railway vehicle comprising an underframe having supporting railway vehicle trucks disposed therebelow, a railway vehicle body slidably supported on said underframe, a pair of transversely spaced longitudinally extending wells in said underframe, a pair of transversely spaced longitudinally extending shear plates rigidly secured to said body and depending therefrom and extending into said wells, pockets formed at either end of said wells and having seated therein resilient cushioning means interposed between the ends of said plates and the ends of said wells.

3. A railway vehicle comprising an underframe having supporting railway vehicle trucks disposed therebeneath, a railway vehicle body slidably supported only adjacent the ends thereof on said underframe adjacent the ends of said underframe, said underframe having a longitudinally extending well formed therein intermediate the ends thereof, a longitudinally extending plate-like member rigidly secured to said body and depending therefrom and extending into said well, and resilient means interposed between the ends of said plate-like member and the ends of said well cushioning longitudinal movement of said body relative to said underframe.

4. A railway vehicle comprising a railway vehicle underframe having supporting railway vehicle trucks disposed therebeneath, said underframe having a pair of transversely spaced longitudinally extending wells intermediate the ends thereof, a railway vehicle body slidably supported only adjacent the ends thereof on said underframe adjacent the ends of said underframe, lateral stop means on said body cooperating with lateral stop means on said underframe limiting the sliding movement of said body relative to said underframe to longitudinal sliding movement, a pair of transversely spaced plate-like members rigidly secured to said body and depending therefrom and extending into said wells, and resilient cushioning means interposed between the ends of said plate-like members and the ends of said wells to cushion said longitudinal movement.

5. In a railway vehicle, an underframe, said underframe being provided with a longitudinally extending well intermediate the ends thereof, a vehicle body slidingly supported on said underframe and having rigidly attached thereto a longitudinally extending shear plate depending therefrom and extending into said well, said shear plate having vehicle end facing plates secured to opposite ends thereof, resilient means interposed between said end plates and the ends of said well to cushion longitudinal movement of said body relative to said underframe, and plate-like members forming the sides and the ends and bottom of said well which completely enclose the sides of said shear plate, the ends of said shear plate including said end plates and the bottom of said shear plate.

6. In a railway vehicle, an underframe having supporting railway vehicle trucks disposed therebeneath, a vehicle body slidably supported on said vehicle, said body comprising an outer wall structure including side, top and end walls rigidly secured together and an inner wall structure comprising top, bottom, side and end walls spaced from the walls of said outer wall structure, means interposed between said wall structures and secured thereto supporting said outer wall structure on said inner wall structure, said inner wall structure being slidably supported on said underframe, said underframe having transversely spaced longitudinally extending wells intermediate the ends thereof, the side walls of said inner wall structure having rigidly secured thereto depending plate-like members extending into said wells, resilient cushioning means interposed between the ends of said wells and the ends of said plate-like members cushioning movement of said wall structures relative to said underframe.

7. In a railway vehicle, an underframe having supporting railway vehicle trucks disposed therebeneath, a vehicle body slidably supported on said vehicle, said body comprising an outer wall structure including side, top and end walls rigidly secured together and an inner wall structure comprising top and bottom, side and end walls spaced from the walls of said outer wall structure, means interposed between said side wall structures and secured thereto supporting said outer wall structure on said inner wall structure, said inner wall structure being slidably supported on said underframe, said underframe having transversely spaced longitudinally extending wells intermediate the ends thereof, the side walls of said inner wall structure having rigidly secured thereto depending plate-like members extending into said wells, resilient cushioning means interposed between the ends of said wells and the ends of said plate-like members cushioning relative movement of said wall structures relative to said underframe, said side and end wall structures being separated by a layer of polyester polyisocyanate foam-type insulation bonded thereto.

References Cited in the file of this patent
UNITED STATES PATENTS

| | | |
|---|---|---|
| 321,601 | Hennessy | July 7, 1885 |
| 1,065,278 | Shoemaker | June 17, 1913 |
| 1,122,378 | Flinn | Dec. 29, 1914 |
| 1,186,461 | Waugh | June 6, 1916 |
| 1,434,490 | Hahl et al. | Nov. 7, 1922 |
| 1,693,193 | Duryea | Nov. 27, 1928 |
| 1,969,844 | Heath | Aug. 14, 1934 |
| 2,021,909 | Brigham | Nov. 26, 1935 |
| 2,040,486 | Kellett | May 12, 1936 |
| 2,047,955 | Fitch | July 21, 1936 |
| 2,070,613 | Norbom | Feb. 16, 1937 |
| 2,149,575 | Bundy | Mar. 7, 1939 |
| 2,155,533 | Dwyer | Apr. 25, 1939 |
| 2,208,650 | Van Der Sluys | July 23, 1940 |
| 2,256,182 | Winship | Sept. 16, 1941 |
| 2,256,377 | Bonsall | Sept. 16, 1941 |
| 2,564,988 | Muller | Aug. 21, 1951 |
| 2,642,818 | Talmey | June 23, 1953 |
| 2,728,305 | Candlin | Dec. 27, 1955 |